(12) United States Patent
Weber

(10) Patent No.: US 8,602,473 B2
(45) Date of Patent: Dec. 10, 2013

(54) PRODUCT GRIPPER

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 0 days.

(21) Appl. No.: 13/379,768

(22) PCT Filed: May 19, 2010

(86) PCT No.: PCT/EP2010/003077
§ 371 (c)(1),
(2), (4) Date: Mar. 5, 2012

(87) PCT Pub. No.: WO2010/149255
PCT Pub. Date: Dec. 29, 2010

(65) Prior Publication Data
US 2012/0146350 A1 Jun. 14, 2012

(30) Foreign Application Priority Data
Jun. 23, 2009 (DE) .......................... 10 2009 030 012

(51) Int. Cl.
*B25J 15/02* (2006.01)
(52) U.S. Cl.
USPC ........................ 294/207; 294/86.4; 294/119.1
(58) Field of Classification Search
USPC ........ 294/119.1, 103.1, 2, 86.4, 67.33, 81.54, 294/207; 901/37, 39; 414/618, 735
See application file for complete search history.

(56) References Cited

U.S. PATENT DOCUMENTS

| 7,682,125 | B2 | 3/2010 | Binder et al. |
| 8,317,241 | B2 * | 11/2012 | Ehnes et al. ...................... 294/2 |
| 2006/0182603 | A1 | 8/2006 | Hawes |
| 2009/0097949 | A1 | 4/2009 | Binder et al. |
| 2009/0104010 | A1 | 4/2009 | Binder et al. |
| 2009/0317221 | A1 * | 12/2009 | Hawes .......................... 414/618 |

FOREIGN PATENT DOCUMENTS

| DE | 10 2008 023 770 A1 | 3/2009 |
| EP | 2 039 632 A1 | 3/2009 |
| JP | 9-267284 A | 10/1997 |
| WO | WO 99/00306 A2 | 1/1999 |

OTHER PUBLICATIONS

International Preliminary Report on Patentability/Written Opinion of the International Searching Authority. dated Jan. 12, 2012.

* cited by examiner

*Primary Examiner* — Saul Rodriguez
*Assistant Examiner* — Gabriela Puig
(74) *Attorney, Agent, or Firm* — Kilpatrick Townsend & Stockton LLP

(57) ABSTRACT

A product gripper for picking up a product is provided. The gripper may include two shovels and a cylinder for moving the shovels between a first position, in which the shovels can be placed onto a support for the product to be picked up, on opposite sides of the product to be picked up, and a second position, in which the shovels may be located at least partially under the product to be picked up. The product gripper may further have a holder for fixing the product to be picked up while the shovels are moved thereunder. The holder may include a belt disposed on the underside thereof, facing the product to be picked up, and a mechanism for arching the belt outwards in the direction of the product to be picked up.

12 Claims, 3 Drawing Sheets

PRODUCT GRIPPER

CROSS-REFERENCES TO RELATED APPLICATIONS

This application is a National Stage of International Application No. PCT/EP2010/003077 filed May 19, 2010, and which claims the benefit of German Application No. 10 2009 030 012.0, filed Jun. 23, 2009, the disclosures of which are incorporated herein by reference.

BACKGROUND OF THE INVENTION

The invention relates to a product gripper for picking up a product, comprising two spade blades, a driving means to move the spade blades between a first position, in which the spade blades can be set onto a support for the product to be picked up at oppositely disposed sides of the product to be picked up, and a second position, in which the spade blades are located at least partly beneath the product to be picked up, and comprising a downholder for the fixing of the product to be picked up while the spade blades are moved beneath it, with the downholder being arranged above a spade blade plane defined by the spade blades.

Product grippers of this type are used, for example, in the food industry to transfer food products from a first conveying means to a second conveying means, to sort them or to introduce them into a packaging. The product grippers are typically mounted at the moving part of a robot.

In a known product gripper of the initially named kind, the downholder is formed by a spring-loaded plate which moves into engagement with the upper side of the product on the lowering of the product gripper onto a product to be picked up, is deflected and fixes the product by the restoring force of the compressed spring.

BRIEF SUMMARY OF THE INVENTION

It is the underlying object of the invention to provide a product gripper which enables a more reliable and more gentle fixing of a product to be picked up.

The object is satisfied by a product gripper having the features of claim 1 and in particular in that the downholder includes a belt strap at its lower side facing the product to be picked up and in that a mechanism is provided for arching the belt strap in the direction of the product to be picked up.

It is the underlying general idea of the invention to realize the fixing of a product to be picked up solely by a belt strap whose arching is controlled by a correspondingly provided mechanism. The radius of the arching of the belt strap can be increased by the mechanism to extend or arch it in the direction of the product to be picked up and to bring it in engagement therewith. Conversely, the mechanism can reduce the radius of the arching, that is so-to-say pull the belt strap flat, to bring the belt strap and the product out of engagement.

It is understood that the belt strap has to have a certain stiffness so that it can exert a sufficient clamping force onto the product to be fixed in the arched state. At the same time, the belt strap proves advantageous due to its flexibility insofar as it can adapt to the surface contour of the product to be fixed, whereby the belt strap is in contact with the product over a larger area and fixes the product more gently and more reliably.

A suitable belt strap includes, for example, a core which has a fabric structure and which is at least regionally surrounded by a plastic jacket which is optionally provided at its surface facing the product to be fixed with a structure which increases the friction, e.g. a nub structure or the like. The thickness of a suitable belt strap can lie in the range from 1 mm to 3 mm.

Advantageous embodiments of the invention can be seen from the dependent claims, from the description and from the drawing.

In accordance with a preferred embodiment, the mechanism is designed to convert the movement of the spade blades from their first position into their section position into an arching of the belt strap in the direction of the product to be picked up. The arching of the belt strap, i.e. that is the moving down of the downholder, is consequently coupled to the movement of the spade blades; more precisely, the downholder is automatically brought into engagement with the product to be fixed when the product gripper closes and the spade blades move beneath the product.

The mechanism is moreover preferably designed so that it increases the radius of arching of the belt strap, that is pulls the belt strap flat, to bring the belt strap and the product out of engagement, when the spade blades move from their second position back into their first position, i.e. the product gripper opens. The coupling of the actuation of the downholder with the movement of the spade blades has the advantage that no separate drive has to be provided for the actuation of the downholder.

Generally, however, an embodiment is also conceivable in which a separate drive is provided for the downholder so that the belt strap can be brought into engagement with the product to be fixed or released from it independently of the movement of the spade blades.

In accordance with a further embodiment, the mechanism includes two slide rails of the downholder to which the belt strap is fastened. The belt strap is advantageously fastened in the region of its ends to mutually remote end faces of the slide rails. The belt strap hereby still has a certain arching even in the pulled-flat state due to it stiffness in the direction of the product to be picked up which facilitates the arching of the belt strap for fixing the product.

The slide rails can be moved toward one another to arch the belt strap in the direction of the product to be picked up. The spacing between the ends of the belt strap is reduced due to the movement of the slide rails toward one another, whereby the radius of the arching of the belt strap increases.

A particularly simple construction embodiment can be realized when the slide rails are movable transversely, and in particular at right angles, to the direction of movement of the spade blades. An embodiment is, however, generally also conceivable in which the slide rails are displaced in the direction of movement of the spade blades.

The slide rails are advantageously coupled to the drive means via a cam guide.

The slide rails can, for example, each have a curved groove or a curved elongate hole in which a respective bolt element is guided. The bolt elements can in this respect be attached to a lever arm provided for the movement of the spade blades.

The lever arm is advantageously pivotable about a pivot axis arranged substantially centrally and oriented perpendicular to the spade blade plane. To achieve a sufficient spacing of the slide rails from one another and a synchronized displacement of the slide rails, the bolt elements are preferably attached to the lever arm at mutually opposite sides of the pivot axis.

The lever arm can be pivotable by means of at least one pneumatically or hydraulically actuable cylinder. Alternatively, however, another drive is also imaginable for the pivoting of the lever arm, for example an electric drive.

The invention will be described in the following purely by way of example with reference to an advantageous embodiment and to the enclosed drawing. There are shown:

DETAILED DESCRIPTION OF THE INVENTION

Figure 1:
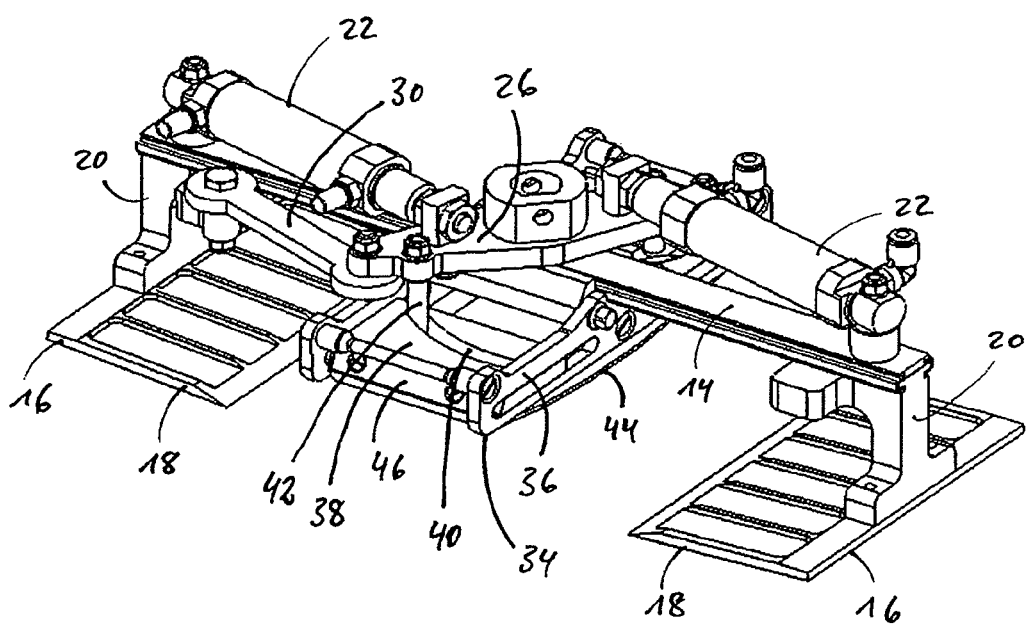
FIG. 1 is a perspective view of a product gripper in accordance with the invention with open spades.

A product gripper in accordance with the invention is shown in the Figures which is provided, for example as part of a robot which is not shown, to pick up a product 12, e.g. a food product, lying on a product support 10 (FIGS. 4 and 5), e.g. on an input belt, and placing it down at another position.

The product gripper includes a carrier 14 to whose lower side two spades 16 are attached which can be moved from a first position, in which the spades 16 have such a large spacing from one another that they can be placed onto the product support 10 at the side next to the product 12 (FIG. 4), into a second position, in which the spades 16 have such a small spacing from one another that they at least partly engage beneath the product 12.

Each spade 16 includes a spade blade 18 which is attached, e.g. screwed, to a spade blade holder 20. The spade blade holders 20 are displaceably supported at the carrier 14. The spade blade holders 20 are formed as rigid so that the spade blades 18 always have a fixedly preset spacing from the carrier 14. The spade blades 18 lie in a plane which will be called a spade blade plane in the following.

To move the spades 16 from the first position into the second position and vice versa, drive means are provided which in the present embodiment include two pneumatically or hydraulically actuable cylinders 22 in which a respective piston 24 is displaceably supported. Generally, however, an embodiment is also conceivable having only one cylinder or having one electric drive for moving the spades 16.

The pistons 24 are connected to a lever arm 26 which is rotatably supported at the carrier 14 centrally about an axis of rotation perpendicular to the spade blade plane. In the region of its one end, the lever arm 26 is connected to the one spade 16 via a pivotable connection arm 30. In the region of its other end, the lever arm 26 is connected to the other spade 16 via a corresponding connection arm 30.

Figure 2:
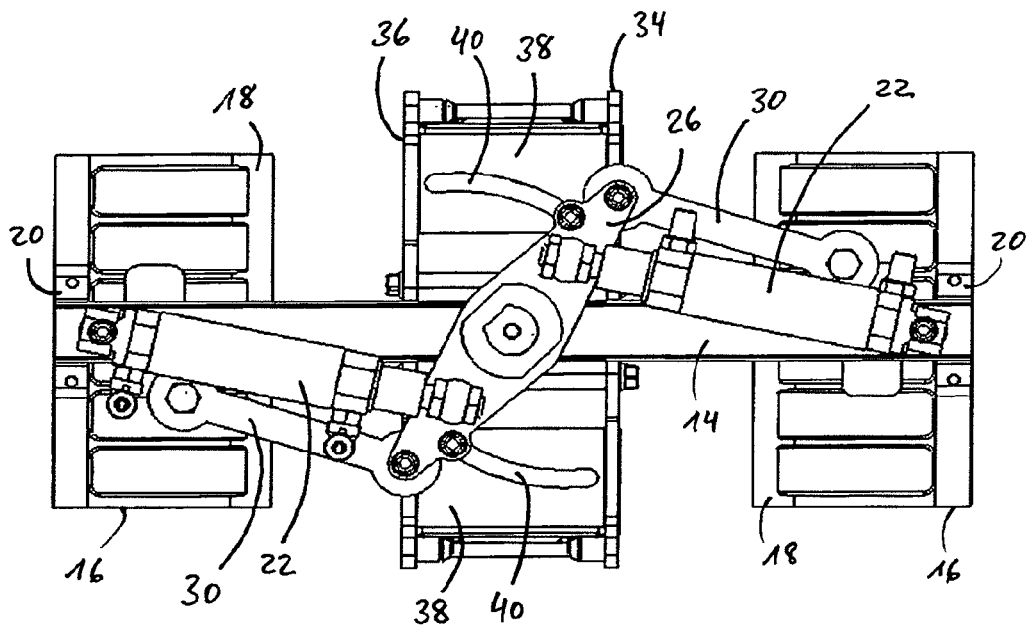
FIG. 2 is a plan view of the product gripper of FIG. 1 with open spades.
Figure 3:
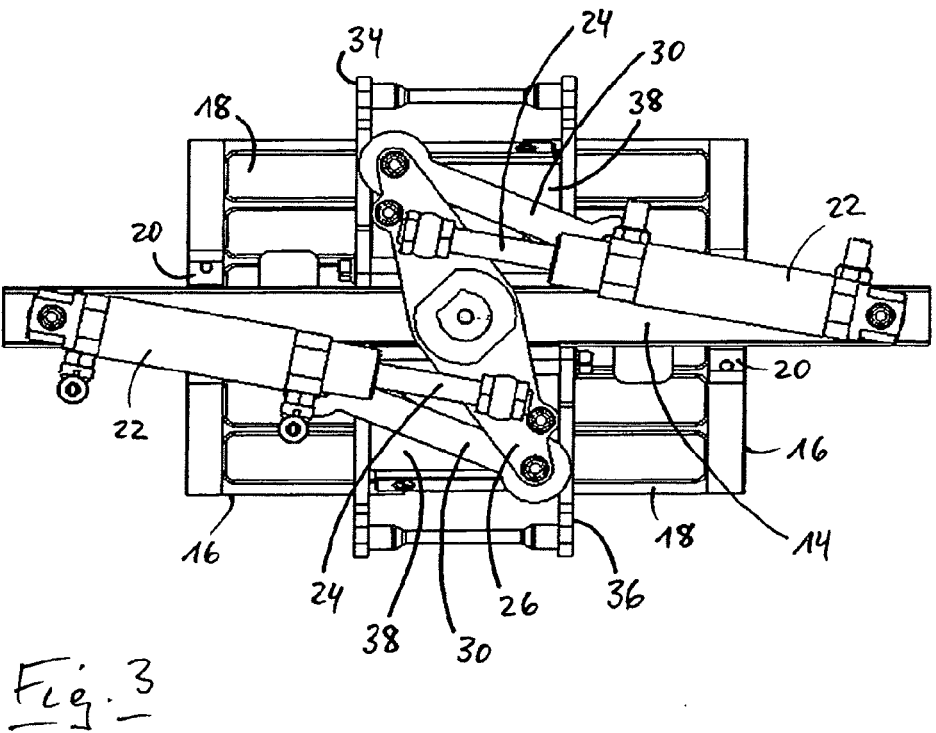
FIG. 3 is a plan view of the product gripper of FIG. 1 with closed spades.
Figure 4:
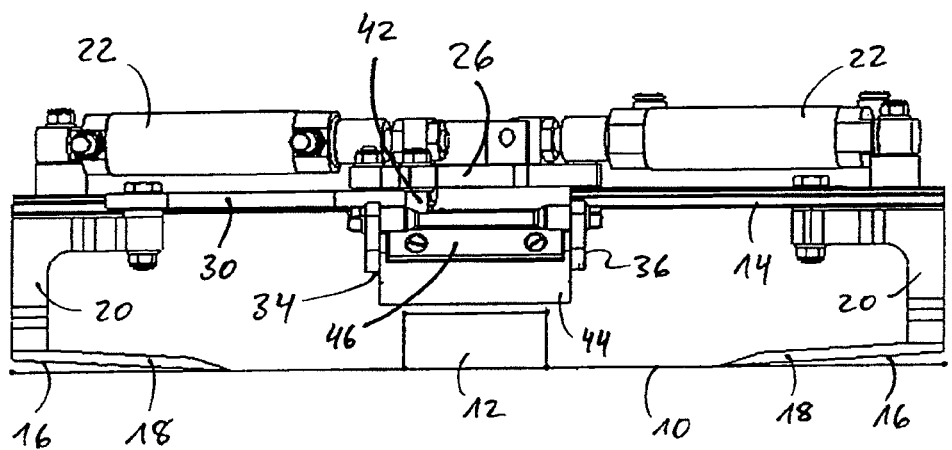
FIG. 4 is a side view of the product gripper of FIG. 1 with open spades.
Figure 5:
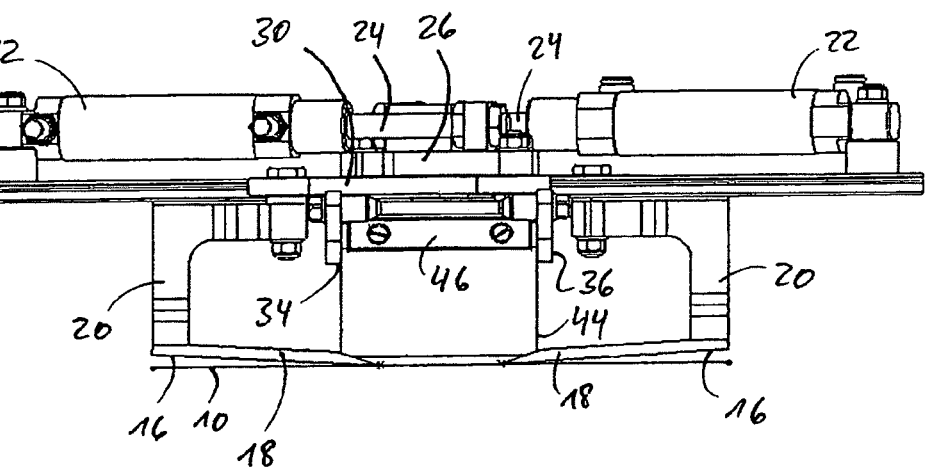
FIG. 5 is a side view of the product gripper of FIG. 1 with closed spades.

If the pistons 24 have moved into their respective cylinders 22, the spades 16 are in their first position (FIGS. 1, 2 and 4). If the cylinders 22 are pressurized, the pistons 24 moving out of the cylinders 22 effect a rotation of the lever arm 26 (counter-clockwise in FIGS. 2 and 3) by which the spades 16 are brought into their second position and the product gripper is closed (FIGS. 3 and 5). The opening of the product gripper, i.e. the movement of the spades 16 from their second position into their first position, takes place in the opposite manner in that the pistons 24 are again moved into their respective cylinders 22.

A downholder 34 is attached centrally between the spades 16 to the lower side of the carrier 14 which serves to fix the product 12 to be picked up and to prevent a slipping of the product 12 while the spade blades 18 are pushed beneath the product 12.

The downholder 34 includes a frame 36 which is fastened to the carrier 14 and which extends transversely to the carrier 14 and thus transversely to the direction of movement of the spade blades 18. Two slide rails 38 are displaceably supported in the frame 36 at both sides of the carrier 14. The slide rails 38 can be moved toward one another and away from one another in a plane parallel to the spade blade plane at right angles to the direction of movement of the spade blades 18.

An elongate hole 40 which is curved around the pivot axis of the lever arm 26 is formed in each slide rail 38. A bolt element 42 which moves along the respective elongate hole 40 on a pivoting of the lever arm 26 is guided in each elongate hole 40 and is fastened to the lever arm 26.

The elongate holes 40 are positioned and curved such that the slide rails 38 are moved toward one another with pistons 24 moving out, that is in FIGS. 2 and 3 on a pivoting of the lever arm 26 counter-clockwise, and are moved apart from one another with pistons 24 moving in, that is in FIGS. 2 and 3 on a pivoting of the lever arm 26 clockwise. In this manner, with spades 16 moving together, the slide rails 38 also move together or, with blades 16 moving apart, the slide rails 38 also move apart.

A belt strap 44 of the downholder 34 is arranged beneath the slide rails 38 and is fastened in the region of its ends to mutually remote end faces of the slide rails 38. More precisely, the end regions of the belt strap 44 are held at the slide rails 38 by means of clamping rails 46 screwed to the slide rails 38 at the end face. The belt strap 44 has a certain stiffness so that it always has a certain arching due to its end-face attachment to the slide rails 38.

The length of the belt strap 44 is selected so that the arching of the belt strap 44 has a comparatively large radius with mutually maximally spaced apart slide rails 38, i.e. in the completely open state of the product gripper (FIGS. 1, 2 and 4). The belt strap 44 is therefore pulled comparatively flat in this position of the slide rails 38.

The product gripper is advantageously dimensioned, i.e. the height of the spade blade holders 20, the height of the frame 36 of the downholder 34 and the length of the belt strap 44 are selected, so that the belt strap 44 does not come into contact with the product 12 to be picked up in the completely open state of the product gripper, but rather has a specific spacing therefrom. If the product gripper closes, the belt strap 14 is arched downwardly by the sliding rails 38 moving toward one another and is pressed onto the product 12 to be picked up (FIG. 5).

Due to its already mentioned stiffness, the belt strap 44 in engagement with the product 12 exerts a specific clamping force onto the product 12. At the same time, the flexibility of the belt strap 44 provides that the belt strap 44 can nestle up to the surface contour of the product 12, whereby a larger contact surface between the belt strap 44 and the product 12 is achieved. As a result, this produces a more reliable and simultaneously more gentle fixing of the product 12.

On the opening of the product gripper, the spades 16 and the slide rails 38 again move apart, whereby the belt strap 44 is pulled flat and the picked-up product 12 is not only released from the spade blades 18, but also from the downholder 34

The invention claimed is:

1. A product gripper for picking up a product, comprising two spade blades,
a drive means to move the spade blades between a first position, in which the spade blades can be placed onto a support for the product to be picked up at oppositely disposed sides of the product to be picked up, and a second position, in which the spade blades are located at least partly beneath the product to be picked up; and a downholder for fixing the product to be picked up while the spade blades are moved beneath the product, with the downholder being arranged above a spade blade plane defined by the spade blades, wherein the downholder has a lower side and includes a belt strap at the lower side facing the product to be picked up; and wherein a mechanism is provided for arching the belt strap in the direction of the product to be picked up, the mechanism including two slide rails of the downholder and the belt strap is fastened to the two slide rails; and wherein the slide rails are movable transversely to the direction of movement of the spade blades.

2. A product gripper in accordance with claim 1, wherein the mechanism is designed to convert the movement of the spade blades from their first position into their second position into an arching of the belt strap in the direction of the product to be picked up.

3. A product gripper in accordance with claim 1, wherein the belt strap is fastened in the region of its ends to mutually remote end faces of the slide rails.

4. A product gripper in accordance with claim 1, wherein the slide rails can be moved toward one another to arch the belt strap in the direction of the product to be picked up.

5. A product gripper in accordance with claim 1, wherein the slide rails are moveable at right angles to the direction of movement of the spade blades.

6. A product gripper in accordance with claim 1, wherein the slide rails are coupled via a cam guide to the drive means.

7. A product gripper in accordance with claim 1, wherein the slide rails each have a curved groove or a curved elongate hole in which a respective bolt element is guided.

8. A product gripper in accordance with claim 7, wherein the bolt elements are attached to a lever arm provided for moving the spade blades.

9. A product gripper in accordance with claim 8, wherein the lever arm is pivotable about a pivot axis arranged substantially centrally and oriented perpendicular to the spade blade plane.

10. A product gripper in accordance with claim 9, wherein the bolt elements are attached to the lever arm at oppositely disposed sides of the pivot axis.

11. A product gripper in accordance with claim 8, wherein the lever arm is pivotable by means of at least one pneumatically or hydraulically actuable cylinder.

12. A product gripper in accordance with claim 7, wherein the lever arm is pivotable by means of at least one electric drive.

* * * * *